Sept. 25, 1962  J. FINK  3,056,053
TWO-PHASE CLOCK MOTOR
Filed Oct. 17, 1958  3 Sheets-Sheet 1
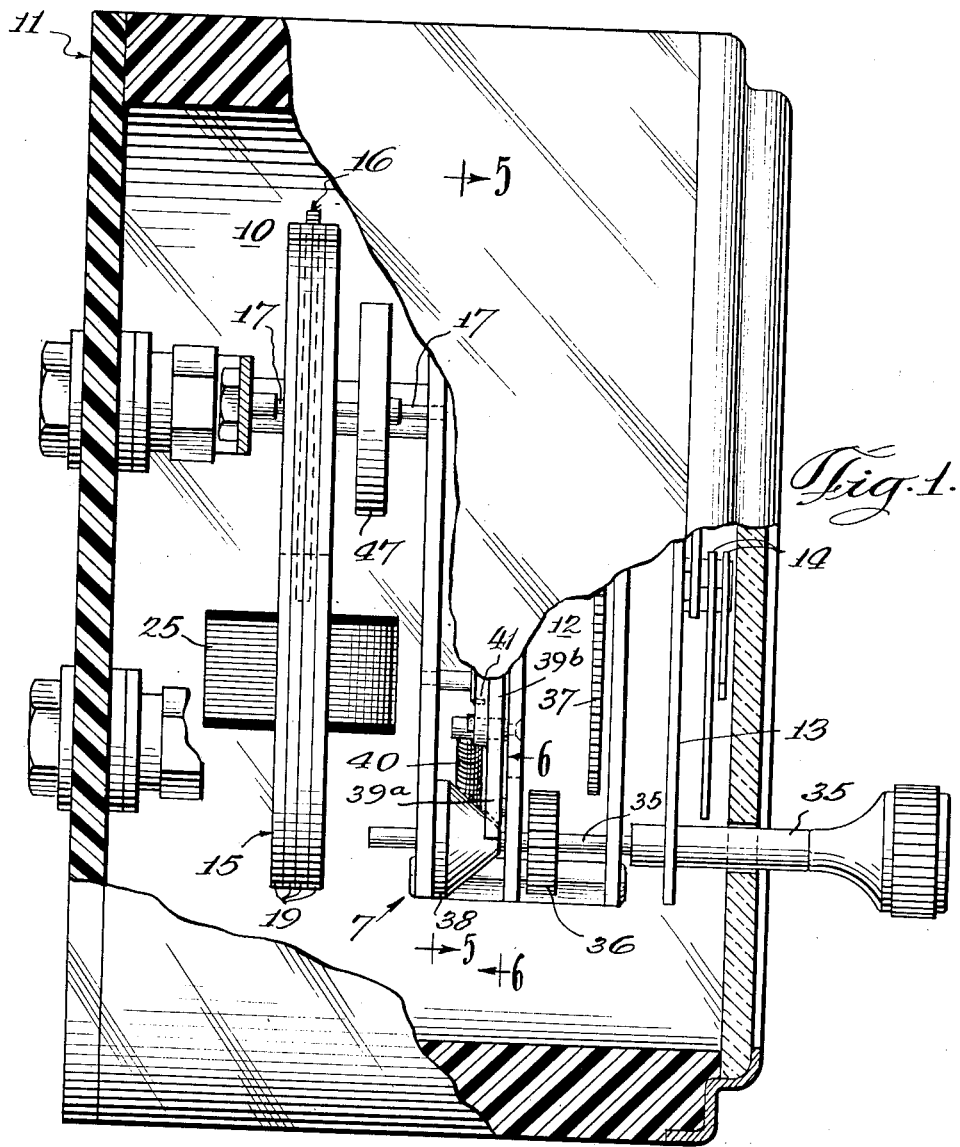
Fig. 1.
Fig. 4.
Fig. 6.
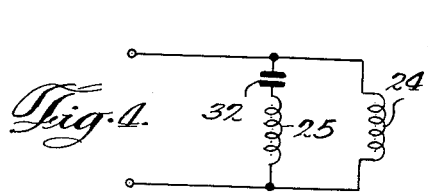
Inventor
Jean Fink
By Schroeder, Hofgren, Brady & Wegner
Attorneys Sept. 25, 1962

J. FINK 3,056,053

TWO-PHASE CLOCK MOTOR

Filed Oct. 17, 1958

Inventor
Jean Fink
By Schroeder, Hoffman, Brady & Wegner
Attorneys

Sept. 25, 1962  J. FINK  3,056,053
TWO-PHASE CLOCK MOTOR
Filed Oct. 17, 1958  3 Sheets-Sheet 3

Inventor
Jean Fink
By Schroeder, Hofgren, Brady & Wegner
Attorneys

United States Patent Office 3,056,053
Patented Sept. 25, 1962

3,056,053
TWO-PHASE CLOCK MOTOR
Jean Fink, Janesville, Wis., assignor to Gibbs Manufacturing & Research Corporation, a corporation of Wisconsin
Filed Oct. 17, 1958, Ser. No. 767,857
5 Claims. (Cl. 310—41)

This invention relates to a two-phase motor particularly adapted for extremely low power consumption.

One feature of the invention is the provision of a motor comprising a stator, two-phase field winding means on the stator, and a rotor of magnetic material, having a periphery with a plurality of pole portions. Another feature is that the rotor includes a toothed ring of magnetic material, preferably mounted on a support of light, nonmagnetic material.

A further feature is that the stator has first and second segments, with each of the segments having pole portions, a field winding for each of the pole portions, and a rotor having pole portions, the first and second pole portions of the stator being offset with respect to the pole portions of the rotor. Still another feature is that the two portions of the stator are energized for two-phase operation.

Yet a further feature is that the stator has first and second segments energized for two-phase operation and providing two primary magnetic circuits, and a magnetic bridge interconnects the stator segments, permitting interaction of the fluxes from the two segments, establishing secondary magnetic circuits. And another feature is that each of the stator segments has a coil receiving portion and a pair of pole portions.

A further feature is the provision of a low power, two-phase motor having a stator, two-phase field winding means and a rotor of magnetic material with a plurality of pole portions, with means for starting the rotor, which may, for example, comprise cam means for imparting a mechanical impulse to the rotor, or may include a conductive, nonmagnetic material forming a part of the rotor and in which eddy currents are induced from the stator to start the rotor.

Further features and advantages will readily be apparent from the following specification and from the drawings, in which:

FIGURE 1 is an enlarged side view of a clock mechanism driven by a motor embodying the invention, with a portion of the housing and structure broken away;

FIGURE 4 is a schematic diagram of the circuit of the motor;

FIGURE 6 is a section taken generally along line 6—6 of FIGURE 1;

The motor disclosed and claimed herein is specifically designed for driving a light load, as a clock or timing mechanism, and for operating from a low power source, as the transistor driver system of copending Gibbs and Fink application, Serial No. 770,322, filed Oct. 29, 1958, now abandoned. The motor, of course, may be operated from other suitable sources and used for driving other mechanisms, as will be apparent to those skilled in the art.

Figure 2:
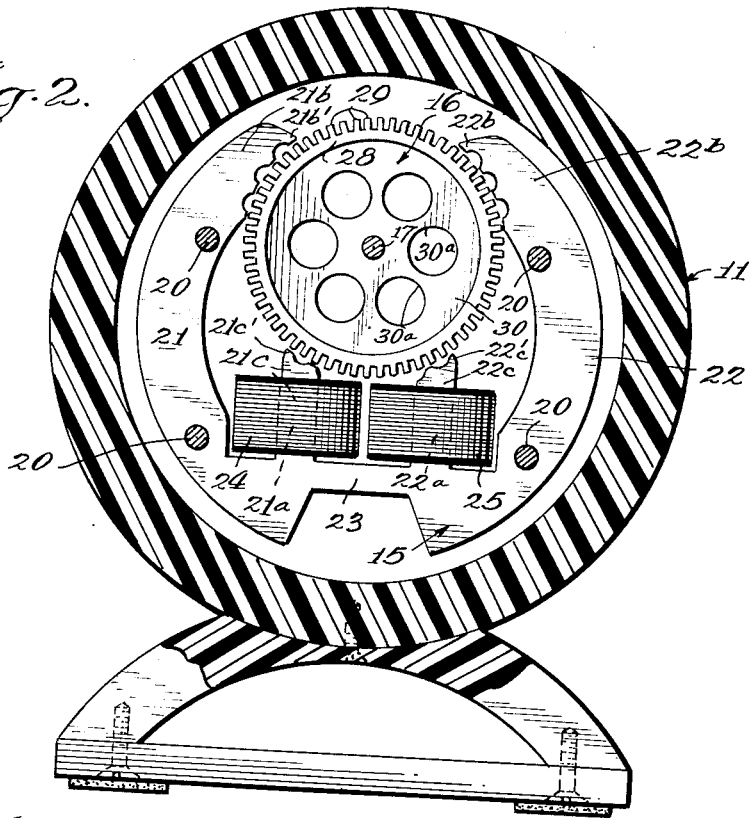
FIGURE 2 is a reduced rear view of the motor.
Figure 3:
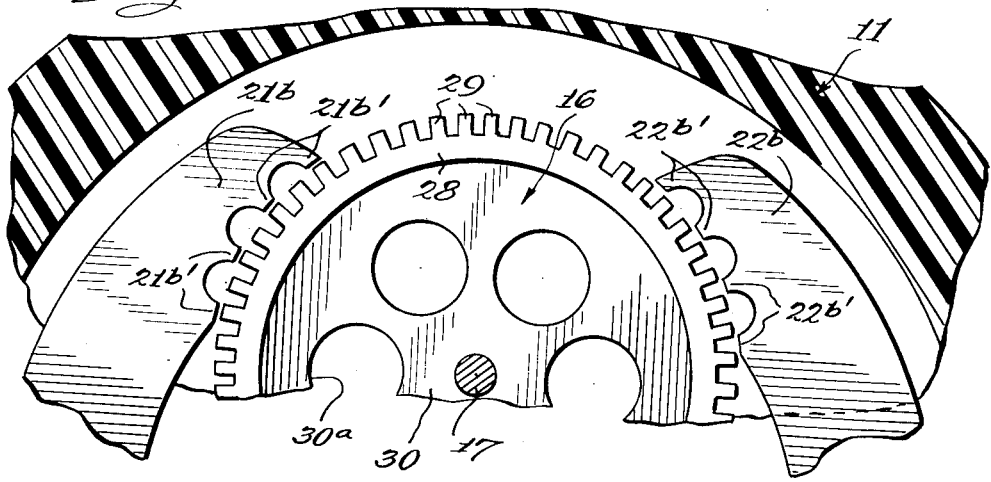
FIGURE 3 is an enlarged fragmentary view of a portion of FIGURE 2.

Turning now to the drawings, and particularly to FIGURES 1, 2 and 3, a motor 10 embodying the invention, is shown mounted in a housing 11, together with a mechanism 12 for a clock having a face 13 and hands 14. The motor includes a stator 15 and a rotor 16 which is mounted on a shaft 17 through which the motor is connected with the gear train of the clock mechanism 12. The stator 15 has a core made up of a plurality of laminations 19 secured together by suitable bolts or rivets 20.

The core has first and second segments 21 and 22 each provided with coil receiving portions 21a and 22a, together with first and second pole portions 21b–21c and 22b–22c. A magnetic bridge 23 joins the base of the coil receiving portions 21a and 22a of the two core segments. The coils 24 and 25 are wound on bobbins and slipped over the coil receiving portions 21a and 22a of the stator core.

The rotor 16 has a periphery provided with a plurality of pole portions of magnetic material. In the embodiment of the invention illustrated in the drawing, the rotor includes a ring 28 having a plurality of teeth 29 formed in the periphery and providing the rotor pole portions. The ring 28 is in turn mounted on a supporting disc 30 of light nonmagnetic material, preferably having a plurality of holes 30a therein to reduce the weight. The disc 30 may, for example, be of plastic or a light nonmagnetic material, as aluminum.

The first and second pole portions, as 21b and 21c, of each of the stator segments are displaced from each other about 90° on the periphery of rotor 16. The pole portions are provided with pole teeth, indicated at 21b', 21c', 22b' and 22c', which correspond with the toothed pole portions 29 of the rotor. It will be noted that pole teeth of the pole segment 22 are displaced 90° from the pole teeth of pole segment 21, with respect to the positioning of the pole teeth of the rotor. The stator pole teeth are preferably aligned with every other pole on the rotor, to simplify manufacture of the stator laminations.

The stator field coils 24 and 25 are energized from a suitable source, as the transistor driver circuit of the aforementioned application, which produces substantially a square wave at a frequency of the order of 300 cycles per second, and are connected for two-phase operation by including a phase shift capacitor 32 in series with one of the coils 25, as shown in FIGURE 4. In one embodiment of the invention, coil 24 comprises 3000 turns of #39 wire having an impedance of 230 ohms, while coil 25 is 3500 turns of #40 wire, with an impedance of 350 ohms. Capacitor 32 has a value of 0.34 microfarad.

The core segments 21 and 22 provide primary magnetic circuits, which are completed through the associated pole portions and primarily, through the arcuate portion of the rotor ring 28 between the pole portions. In addition, the bridge portion 23 of the stator core interconnects the magnetic circuits of the core segments and coils 24 and 25, so that secondary magnetic circuits are set up between the pole portions of the first and second segments, depending upon the instantaneous polarity of the fields set up by the out of phase currents flowing through the coils. The precise theory of operation of the motor with the bridge 23 in the magnetic circuit is not known, but it is believed that it affords the additional flux circuit described above so that some of the flux from each coil acts through the stator structure associated with the other coil. Experiments have shown that the motor operation is improved by the bridge. The optimum cross-sectional size of the bridge appears to be of the order of one-third the cross-sectional size of the main body of the stator segment itself. If the bridge is made too big it shunts an excessive amount of the flux between the coils. If it is made too small, not enough of the flux from each coil interacts in the magnetic circuit of the other coil.

Figure 5:
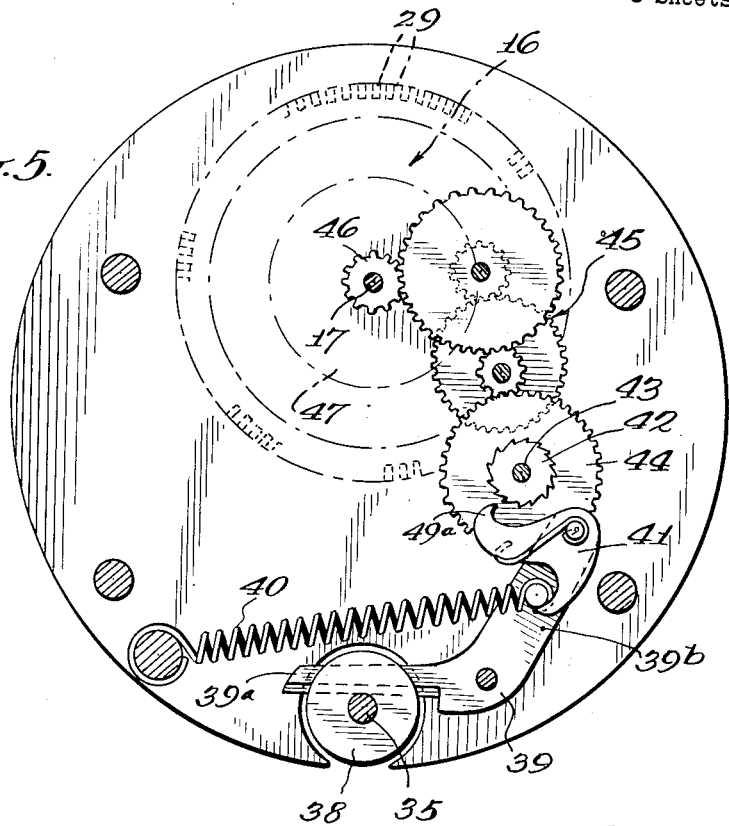
FIGURE 5 is a section taken generally along line 5—5 of FIGURE 1.

With a power source of limited capacity, as the transistor driver circuit mentioned above, which may have an available power output of the order of 10–15 milliwatts, and a voltage of less than 10 volts, the reluctance motor may not develop sufficient torque to be self-starting. One form of motor starting arrangement is illustrated in FIGURES 1, 5 and 6. The clock mechanism 12 is provided with a manually operable hand setting mechanism including a stem 35 which carries a gear 36 that may be meshed with a gear 37 in the clock mechanism by pulling the stem outwardly, against spring means (not shown) which tend to move the stem to the position shown in FIGURE 1. Carried on the stem 35 is a cone-shaped cam 38 which, upon movement of the stem outwardly, engages an arm 39a of bell crank 39, rotating the bell crank clockwise (FIGURE 5) against the action of return spring 40. Carried on the arm 39b of the bell crank is a pivotally mounted dog 41 with a hooked end portion 49a that engages the teeth of a ratchet 42. Ratchet wheel 42 is in turn carried on the same shaft 43 with gear 44 which forms a part of a gear train 45 meshed with a gear 46 on the shaft 17 of rotor 16. Thus, if the clock should for some reason stop, when the hands are reset, cam 38 moves bell crank 39 to impart a mechanical impulse through gear train 45 to the rotor 16 of the drive motor. A spring-loaded fly wheel 47 carried on the motor shaft 17 provides sufficient inertia to keep the rotor turning until it locks in at synchronous speed.

Figure 8:
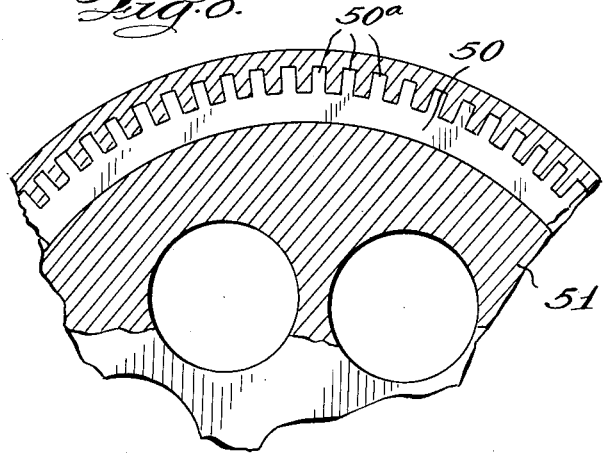
FIGURE 8 is an enlarged fragmentary view of the rotor of FIGURE 7 with a portion broken away.
Figure 7:
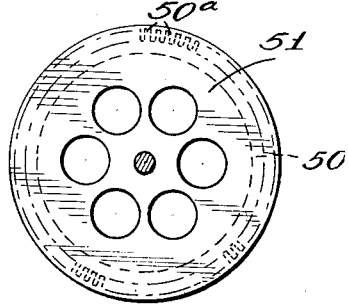
FIGURE 7 is a reduced elevation of a modification of the rotor.

A modified rotor construction is illustrated in FIGURES 7 and 8, which allows the elimination of the mechanical impulse staring arrangement of FIGURES 5 and 6, even in a low power motor. In FIGURES 7 and 8, the rotor ring 50, which is of magnetic material and has peripheral pole teeth 50a, is embedded in a disc 51 of a conductive, but nonmagnetic material, as aluminum. The conductive material completely surrounds the magnetic ring 50 and each of the teeth 50a. The conductive material acts as a shorted turn around each of the rotor pole portions, in which eddy currents are induced, causing the motor to start.

While I have shown and described certain embodiments of my invention, it is to be understood that it is capable of many modifications. Changes therefore, in the construction and arrangement may be made without departing from the spirit and scope of the invention as disclosed in the appended claims.

I claim:
1. A two-phase electric motor, comprising: a rotor of magnetic material having substantially equally spaced pole projections extending therefrom; a crescent-shaped stator of magnetic material having first, second and third segments encompassing a portion of said rotor, said first and third segments being separated by said second segment which forms a magnetic bridge therebetween of a predetermined cross-sectional area; first and second poles positioned on said first and third segments adjacent said second segment and extending towards said rotor and separated therefrom by an air gap, third and fourth poles positioned on said first and third segments at approximately the end portions of said crescent-shaped stator, extending radially towards said rotor, and separated therefrom by an air gap; and field windings on each of said first and second poles for establishing two-phase magnetic flux in said stator and said rotor.

2. A two-phase electric motor, comprising: a rotor of magnetic material having substantially equally spaced pole projections extending therefrom; a crescent-shaped stator of magnetic material having first, second and third segments encompassing a portion of said rotor, said first and third segments being separated by said second segment which forms a magnetic bridge therebetween of a cross-sectional area less than the cross-sectional area of said first and third segments; first and second poles positioned on said first and third segments adjacent said second segment, extending towards said rotor and separated therefrom by an air gap; third and fourth poles positioned on said first and third segments at approximately the end portions of said stator, extending radially inwardly towards said rotor and separated therefrom by an air gap, the separation between the ends of the crescent-shaped stator being substantially larger than the air gaps between the poles and the said rotor; and field windings on each of said first and second pole for establishing two-phase flux in said stator and said rotor.

3. The electric motor as claimed in claim 2 wherein the first, second, third and fourth poles are substantially equally spaced about said rotor.

4. A two-phase electric motor, comprising: a rotor of magnetic material having substantially equally spaced pole projections extending therefrom; a crescent-shaped stator of magnetic material having first, second and third segments encompassing a portion of said rotor, said first and third segments being separated by said second segment which forms a magnetic bridge therebetween of a predetermined cross-sectional area; first and second poles positioned on said first and third segments adjacent said second segment, extending towards said rotor and separated therefrom by an air gap; third and fourth poles positioned on said first and third segments at approximately the end portions of said stator extending radially inwardly towards said rotor and separated therefrom by an air gap, said first, second, third and fourth poles having regularly spaced toothed faces extending parallel to the axis of said rotor, the toothed pole faces on the first segment being aligned opposite said pole projections of said rotor when the toothed pole faces on the third segment are aligned with the spaces between said pole projections on said rotor.

5. A two-phase electric motor, comprising: a rotor of magnetic material having substantially equally spaced pole projections extending therefrom said rotor being carried by a support of conductive non-magnetic material; a crescent-shaped stator of magnetic material having first, second and third segments encompassing a portion of said rotor, said first and third segments being separated by said second segment which forms a magnetic bridge therebetween of a predetermined cross-sectional area; first and second poles positioned on said first and third segments adjacent said second segment, extending towards said rotor, and separated therefrom by an air gap; third and fourth poles positioned on said first and third segments at approximately the end portions of said crescent-shaped stator, extending radially towards said rotor, and separated therefrom by an air gap; and field windings on each of said first and second poles for establishing a two-phase flux in said stator and said rotor.

References Cited in the file of this patent

UNITED STATES PATENTS

| | | |
|---|---|---|
| 1,708,334 | Spencer | Apr. 9, 1929 |
| 1,950,898 | Mansfield | Mar. 13, 1934 |
| 1,978,855 | Balzer | Oct. 30, 1934 |
| 2,078,257 | Liner | Apr. 27, 1937 |
| 2,105,513 | Welch | Jan. 13, 1938 |
| 2,157,752 | Freistadter | May 9, 1939 |
| 2,295,286 | Michelsen | Sept. 8, 1942 |
| 2,483,539 | Hansen | Oct. 4, 1949 |
| 2,780,764 | Morrison | Feb. 5, 1957 |